United States Patent [19]

Duquenne

[11] Patent Number: 5,360,579
[45] Date of Patent: Nov. 1, 1994

[54] PROCESS FOR THE ABSORPTION OF POLLUTANTS

[75] Inventor: Daniel Duquenne, Clermont, France

[73] Assignee: Elf Atochem, S.A., Paris, France

[21] Appl. No.: 171,400

[22] Filed: Dec. 22, 1993

Related U.S. Application Data

[60] Division of Ser. No. 18,929, Feb. 6, 1993, which is a continuation of Ser. No. 582,918, Apr. 19, 1991, abandoned.

[30] Foreign Application Priority Data

Feb. 17, 1989 [FR] France .................................. 89 02099

[51] Int. Cl.$^5$ .................. B01D 17/04; C02F 1/28; C10G 33/04
[52] U.S. Cl. ............................. 252/329; 210/799; 210/923; 210/694; 210/680; 137/7
[58] Field of Search .................. 252/358, 329, 331; 502/402, 411; 210/799, 680, 484, 502.1, 504, 506, 924, 242.4, 693; 134/7

[56] References Cited

U.S. PATENT DOCUMENTS 4,011,159  3/1977  Stein et al. ........................... 210/40
4,058,453  11/1977  Patel et al. .......................... 208/188

OTHER PUBLICATIONS

English translation of WO 88/06141 Aug. 25, 1988.

*Primary Examiner*—Robert L. Stoll
*Assistant Examiner*—Daniel S. Metzmaier
*Attorney, Agent, or Firm*—Finnegan, Henderson, Farabow, Garrett & Dunner

[57] ABSTRACT

A process for absorbing a water-soluble oil present as an aqueous emulsion in a cutting fluid which comprises contacting said cutting fluid with a composition containing at least one norborene polymer selected from polycyclo [2.2.1]-2-heptene or poly-5-methylbicyclo[2.2.1]-2-heptene, and at least one alkaline earth metal halide as an agent for breaking an aqueous emulsion of a water-soluble oil.

12 Claims, No Drawings

PROCESS FOR THE ABSORPTION OF POLLUTANTS

This is a division of application Ser. No. 08/018,929, filed Feb. 16, 1993, which was a continuation of Ser. No. 07/582,918, filed Apr. 19, 1991, now abandoned.

The present invention relates to the field of depollution and more particularly to a composition and a process for absorbing polluting products.

The engineering industry employs all sorts of oils which must be discarded after use when they cannot be recovered satisfactorily with a view to a second use. This problem arises in particular in the case of fluids known as "cutting fluids" employed for cooling some parts of machine tools such as lathes, milling machines and the like. In the case of cutting fluids, which are generally made up of water, water-soluble oil and additives, the problem of getting rid of them after use is particularly awkward to solve. This discarding is at present being effected by various means, none of which is really satisfactory technically and economically. The first means, clandestine discarding by pouring into the drains or into a river must be avoided for obvious statutory reasons of pollution of rivers and/or of ground waters. The second means, generally employed by firms getting rid of moderate quantities of cutting fluids to be discarded, namely the removal of liquid wastes by specialized treatment firms, is costly. The third means, which is suited to firms disposing of large quantities of cutting fluids to be discarded, the treatment of the cutting fluids directly by the user, can resort to a number of methods. A common feature of these methods is generally breaking the aqueous emulsion of water-soluble oil so as to be able to separate and recover the said oil. A first method thus consists in breaking the emulsion using iron sulphate and then neutralizing the mixture with lime. The obvious disadvantage of this method lies in the color of the residual water and in the associated pollution caused by the iron sulphate. A second method consisting in breaking the emulsion using surfactants is reflected in an excessive chemical oxygen demand in the residual water. A third method, employing ultrafiltration, reverse osmosis or dialysis necessitates a costly and relatively inefficient device. A fourth method, employing calcium chloride as breaking agent makes it possible to recover the oil on the surface of the water, but is reflected in an excessive chemical oxygen demand in the residual water. Finally, a fifth method coupling calcium chloride as breaking agent with an ultrafine hydrophobic silica as absorbing agent results in obtaining a sludge containing the oil at the bottom of the treatment storage vessel, which substantially complicates the recovery of the polluting product.

From the above outline it follows that so far the problem of the removal of cutting fluids after use has not received any solution which is at the same time satisfactory from the viewpoint of environmental protection (an acceptable level of chemical oxygen demand in the residual water), and which is economical and easy to implement both from the viewpoint of the breaking of the emulsion present in the cutting fluids and from the viewpoint of the method of recovery of the water-soluble oil. This problem is the one with which the present invention is concerned.

Furthermore, patent FR-A-2,288,709 discloses a process for the removal and the recovery of petroleum products, especially heavy hydrocarbons, which are spread over a liquid or solid surface by bringing into contact with the said petroleum product a finely divided polymer capable of producing with the petroleum product a film having a sufficient strength to be capable of being pulled, followed by removal of the said film by mechanical means. A preferred polymer for making use of this process is a polymer of bicyclo[2.2.1]-2heptene or of its methyl derivative, these polymers forming with petroleum hydrocarbons a coherent film capable of containing up to 10 parts by weight of petroleum products per one part of polymer. The contact of the polymer with the petroleum product is brought about, according to this known process, merely by sprinkling the polymer on the surface of the said product.

Patent application WO 88/06,141 concerns chiefly, with a view to solving the problems presented by the scattering of a powdered polymer in windy weather, the way in which this polymer comes into contact with the polluting products to be absorbed, and proposes to improve the effectiveness of the polymer by enclosing it in a finely meshed protective bag.

Lastly, patent U.S. Pat. No. 4,058,453 describes a process for recovering the oil from an emulsion containing clay as stabilizing agent, consisting firstly in adding to the emulsion from 10 to 60 ppm of a polyethylene oxide which has a molecular weight of $10^5$ to $7*10^6$ and from 100 to 20,000 ppm of an alkaline-earth metal halide in aqueous solution, and then separating the oil from the water and from the clay.

The invention is based on the finding that by coupling an agent for breaking an aqueous emulsion of water-soluble oil, such as calcium chloride, with an absorbing agent consisting of a norbornene polymer, a means is available which is efficient, economical and easy to use for getting rid of cutting fluids after use.

Thus, a first subject of the present invention consists of a composition for absorbing polluting products comprising at least one norbornene polymer, characterized in that it additionally comprises at least one agent for breaking an aqueous emulsion of water-soluble oil and in that the said composition comprises from 5 to 250 parts by weight of the said emulsion-breaking agent per 100 parts by weight of the norbornene polymer.

A preferred emulsion-breaking agent for making use of the present invention is an alkaline-earth metal halide such as especially calcium chloride.

The composition according to the invention may additionally comprise at least one plasticizer for the norbornene polymer, preferably in a proportion of 5 to 50 parts by weight per 100 parts by weight of the said polymer.

A norbornene polymer within the meaning of the present invention means a polymer chosen from polycyclo[2.2.1]-2-heptene and poly-5-methylbicyclo[2.2.1]-2-heptene. A plasticizer for the norbornene polymer means an agent capable of agglomerating the power of the said polymer while imparting some degree of plasticization thereto, such as a relatively nonvolatile compound chosen from aliphatic, alkylaromatic, aromatic and naphthenic hydrocarbons and organic esters derived from aliphatic and alicyclic alcohols, (such as phthalates, adipates, sebacates and the like) and mixtures thereof.

The composition according to the invention may additionally comprise the following usual adjuvants:
  at least one anticaking agent such as a metal stearate, in a proportion ranging up to 5% by weight relative to the polymer, at least one colorant in a conventional proportion,
at least one deodorizing agent,
at least one inorganic filler such as talc, silica, fly ash, clay, alumina, and the like, or an organic one, such as fibrous or powdered cellulose, polyethylene, polypropylene or polystyrene and the like.

The composition according to the invention can be used in various ways with a view to getting rid of cutting fluids after use. This is why the second subject of the present invention is a process for absorbing the water-soluble oil present in a cutting fluid, characterized in that the said fluid is brought into contact with at least one composition such as is described above. This contact may be brought about, for example, by passing the cutting fluid to be treated through a filter packed with the composition according to the invention. The contact may also be brought about by pouring the composition according to the invention into a storage vessel containing the cutting fluid and by stirring the latter so that the composition is dispersed homogeneously in the cutting fluid. It will be possible, in particular, to control the homogeneity of the dispersion by means of the stirring speed, which will depend on the temperature, the composition of the cutting fluid and the size and shape of the storage vessel. In this second method of making use of the process according to the invention, a proportion of composition employed in relation to the cutting fluid will be advantageously such that the quantity of polynorbornene represents from 10 to 100%, preferably from 20 to 45% by weight of the quantity of oil present in the cutting fluid.

The following examples are given by way of illustration and without limiting the present invention.

Example 1 (comparative)

The cutting fluid considered consists of an emulsion of mineral oil (marketed by the Shell company under reference S 7353) at a concentration of 6% by weight in water, which has a chemical oxygen demand equal to 76,000. 2.5% by weight of calcium chloride is added with stirring to this emulsion, which has been poured into a storage vessel. The oily phase rises to the surface of the emulsion and the chemical oxygen demand measured in the residual aqueous phase amounts to 1,760.

Example 2

To the mineral oil emulsion of example 1 is added, with stirring, 5% by weight of a composition comprising, per 100 parts by weight, 50 parts of calcium chloride, 40 parts of polynorbornene marketed by the Applicant Company under the name Norsorex AP and 10 parts of a naphthenic oil marketed by Nynas under the name Nytene 10. The proportion of calcium chloride during the treatment is thus identical with that of example 1. At the end of the treatment a supernatant cake is recovered at the surface of the storage vessel and the chemical oxygen demand measured in the residual aqueous phase amounts to 350. In contrast to the result of example 1, the cake can be easily pulled and recovered.

I claim:

1. A process for absorbing a water-soluble oil present as an aqueous emulsion in a cutting fluid which comprises contacting said cutting fluid with a composition containing at least one norborene polymer selected from the group consisting of polycyclo [2.2.1]-2-heptene and poly-5-methylbicyclo [2.2.1]-2-heptene, and at least one alkaline earth metal halide as an agent for breaking an aqueous emulsion of water-soluble oil wherein said composition comprises from 5 to 250 parts by weight of said emulsion breaking agent per 100 parts by weight of norborene polymer.

2. A process according to claim 1, wherein the composition further comprises at least one plasticizer for the norborene polymer.

3. A process according to claim 1, wherein the composition further comprises at least one metal stearate anticaking agent in a proportion ranging up to 5% by weight relative to the norborene polymer.

4. A process according to claim 1, wherein the composition further comprises at least one filler.

5. A process according to claim 1, wherein the composition further comprises an inorganic filler chosen from the group consisting of talc, silica, clay, alumina and fly ash.

6. A process according to claim 1, wherein the composition further comprises an organic filler chosen from the group consisting of fibrous cellulose, powdered cellulose, polyethylene, polypropylene and polystyrene.

7. A process according to claim 1, wherein the composition further comprises a plasticizer for the norborene polymer, said plasticizer being a relatively nonvolatile compound chosen from the group consisting of organic esters derived from aliphatic and alicyclic alcohols, aliphatic hydrocarbons, aromatic hydrocarbons, alkyl aromatic and naphthenic hydrocarbons and mixtures thereof.

8. A process according to claim 2, wherein the plasticizer is present in the composition in an amount from 5 to 50 parts by weight per 100 parts by weight of the norborene polymer.

9. Process according to claim 1, wherein the contact is brought about by passing the cutting fluid to be treated through a filter packed with the said composition.

10. Process according to claim 1, wherein the contact is brought about by pouring said composition into a storage vessel containing the cutting fluid and by stirring the latter so that the composition is dispersed homogeneously in the cutting fluid.

11. Process according to claim 10, wherein a proportion of composition employed relative to the cutting fluid is such that the quantity of polynorbornene represents from 10 to 100% of the quantity of oil present in the cutting fluid.

12. Process according to claim 11, wherein the quantity of polynorbornene represents from 20 to 45% of the quantity of oil present in the cutting fluid.

* * * * *

UNITED STATES PATENT AND TRADEMARK OFFICE
CERTIFICATE OF CORRECTION

PATENT NO. : 5,360,579
DATED : November 1, 1994
INVENTOR(S) : Daniel DUQUENNE

It is certified that error appears in the above-indentified patent and that said Letters Patent is hereby corrected as shown below:

On the title page, item [60]:

Related U.S. Application Data, line 1, change "No. 18,929" to --No. 18,919-- and "Feb. 6" to --Feb. 16--.

Signed and Sealed this

Third Day of January, 1995

Attest:

BRUCE LEHMAN

Attesting Officer     Commissioner of Patents and Trademarks